United States Patent
Celi et al.

(10) Patent No.: US 12,505,638 B2
(45) Date of Patent: Dec. 23, 2025

(54) SYSTEM AND METHOD TO DETERMINE ANOMALOUS BEHAVIOR

(71) Applicant: Sensormatic Electronics, LLC, Boca Raton, FL (US)

(72) Inventors: Joseph Celi, Boca Raton, FL (US); Gopi Subramanian, Boca Raton, FL (US)

(73) Assignee: Sensormatic Electronics, LLC, Boca Raton, FL (US)

( * ) Notice: Subject to any disclaimer, the term of this patent is extended or adjusted under 35 U.S.C. 154(b) by 489 days.

(21) Appl. No.: 18/163,783

(22) Filed: Feb. 2, 2023

(65) Prior Publication Data

US 2023/0281946 A1     Sep. 7, 2023

Related U.S. Application Data

(60) Provisional application No. 63/305,881, filed on Feb. 2, 2022.

(51) Int. Cl.
    *G06V 10/25*          (2022.01)
    *G06T 7/11*           (2017.01)
    (Continued)

(52) U.S. Cl.
    CPC ............... *G06V 10/25* (2022.01); *G06T 7/11* (2017.01); *G06V 10/44* (2022.01); *G06V 10/764* (2022.01);
    (Continued)

(58) Field of Classification Search
    CPC ...... G06V 10/25; G06V 10/44; G06V 10/764; G06V 10/765; G06V 20/52; G06V 20/44;
    (Continued)

(56) References Cited

U.S. PATENT DOCUMENTS

2013/0182905 A1*   7/2013   Myers .................. A61B 5/1113
                                                               382/103
2019/0130189 A1*   5/2019   Zhou .................. G06V 10/7515
                     (Continued)

OTHER PUBLICATIONS

Ramachandra et al. A Survey of Single-Scene Video Anomaly Detection, IEEE (Year: 2020).*

(Continued)

*Primary Examiner* — John B Strege
(74) *Attorney, Agent, or Firm* — ArentFox Schiff LLP

(57) ABSTRACT

The present disclosure relates to a system for determining anomalous behavior. The system comprises a processing device that is configured to generate first segmentation information and second segmentation information from the video feed, the first segmentation information corresponding to a first potential occupant and the second segmentation information corresponding to a second potential occupant. The processing device further configured to determine that the first segmentation information and the second segmentation information correspond to actual occupants based on the first segmentation information and the second segmentation information, and generate a first bounding box associated with the first segmentation information and a second bounding box associated with the second segmentation information. The processing device further configured to determine an intersection over union (IOU) region for the first bounding box and the second bounding box, identify anomalous behavior based on the IOU region, and generate one or more alerts identifying the anomalous behavior.

20 Claims, 12 Drawing Sheets

(51) Int. Cl.
*G06V 10/44* (2022.01)
*G06V 10/764* (2022.01)
*G06V 20/52* (2022.01)
*G06V 40/20* (2022.01)

(52) U.S. Cl.
CPC .............. *G06V 20/52* (2022.01); *G06V 40/20* (2022.01); *G06T 2207/30196* (2013.01)

(58) Field of Classification Search
CPC .. G06V 40/20; G06T 7/11; G06T 2207/30196
See application file for complete search history.

(56) References Cited

U.S. PATENT DOCUMENTS

| | | | |
|---|---|---|---|
| 2019/0213406 A1* | 7/2019 | Porikli | G06V 20/597 |
| 2020/0302248 A1* | 9/2020 | Zhang | G06N 5/01 |
| 2021/0019666 A1* | 1/2021 | Tsukamoto | G06V 10/7747 |
| 2024/0062385 A1* | 2/2024 | Srinivasan | H04N 7/18 |
| 2025/0005932 A1* | 1/2025 | Kandabhattu | G06V 20/52 |
| 2025/0078516 A1* | 3/2025 | Qi | G06V 20/70 |

OTHER PUBLICATIONS

201Yao et al. Unsupervised Traffic Accident Detection in First-Person Videos (Year: 2019).*
Chen et al., "YOLO with embedded DenseNet Approach to detect Human Interaction (Computer Vision)," CS230, Jun. 4, 2021, Retrieved from the Internet: <URL: http://cs230.stanford.edu/projects_spring_2021/reports/45.pdf>, pp. 1-7.
Hoang et al., "Context-Aware Emotion Recognition Based on Visual Relationship Detection," IEEE Access, Jun. 21, 2021, vol. 9, pp. 90465-90474.
International Search Report and Written Opinion in PCT/US2023/061882, mailed May 2, 2023, 15 pages.
Patron-Perez et al., "High Five: Recognising Human Interactions in TV Shows," Proceedings of the British Machine Vision Conference, Jan. 1, 2010, Retrieved from the Internet: <URL: http://www.bmva.org/bmvc/2010/conference/paper50/paper50.pdf>, pp. 1-11.
Patron-Perez et al., "Structured Learning of Human Interactions in TV Shows," IEEE Transactions on Pattern Analysis and Machine Intelligence, Dec. 2012, vol. 34, No. 12, pp. 2441-2453.
Sannigrahi, S., "Moving In Sync: Self-Supervised Learning of n-Human Interactions: CSE 303 Final Project," Ecole Polytechnique, Dec. 13, 2020, pp. 1-7.

* cited by examiner

SYSTEM AND METHOD TO DETERMINE ANOMALOUS BEHAVIOR

CROSS REFERENCE TO RELATED APPLICATION(S)

The present Application for Patent claims priority to U.S. Provisional Patent Application No. 63/305,881, entitled "A SYSTEM AND METHOD TO DETERMINE ANOMALOUS BEHAVIOR" and filed on Feb. 2, 2022, which is assigned to the assignee hereof, and incorporated herein by reference in its entirety.

BACKGROUND

The present disclosure relates generally to retail environment. Particularly, the present disclosure relates to systems and methods to detect anomalous behavior among occupants in a building environment.

Generally, building spaces that encounter large public gatherings such as retail stores, malls etc., are prone to accidents, crimes or other such incidents posing a security risk. Such retail environments require advance surveillance systems to ensure security of the spaces. In large public spaces, it is often difficult to detect anomalous behavior among occupants of the space in real-time. For example, detecting anomalous behavior among occupants such as violence, shoplifting etc., is a critical requirement as it may pose a threat to the security of the building space, sometimes leading to accidents, casualties, property loss or other such incidents. Security devices such as CCTV cameras are installed in such spaces to monitor occupants of the space. However, manually monitoring a large number of CCTV cameras to detect any security risk in real-time is challenging. Conventional systems employ techniques such as video anomaly detection for monitoring retail environments. However, the conventional techniques generally fail to effectively determine anomalous behavior among occupants in real-time. In addition, conventional techniques are computationally complex.

There is, therefore, felt a need to provide a system and method that alleviates the aforementioned drawbacks of the conventional systems to detect anomalous behavior among occupants of a building space.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In some aspects, the techniques described herein relate to a system including: a video capture device configured to capture a video feed and provide the video feed to a processing device; and the processing device including: a memory storing instructions thereon; and at least one processor coupled with the memory and configured by the instructions to: generate first segmentation information and second segmentation information from the video feed, the first segmentation information corresponding to a first potential occupant and the second segmentation information corresponding to a second potential occupant; determine that the first segmentation information and the second segmentation information correspond to actual occupants based on the first segmentation information and the second segmentation information being greater than a predefined threshold; generate a first bounding box associated with the first segmentation information and a second bounding box associated with the second segmentation information; determine an intersection over union (IOU) region for the first bounding box and the second bounding box; identify anomalous behavior based on the IOU region; and generate one or more alerts identifying the anomalous behavior.

In some aspects, the techniques described herein relate to a method including: generating first segmentation information and second segmentation information from a video feed, the first segmentation information corresponding to a first potential occupant and the second segmentation information corresponding to a second potential occupant; determining that the first segmentation information and the second segmentation information correspond to actual occupants based on the first segmentation information and the second segmentation information being greater than a predefined threshold; generating a first bounding box associated with the first segmentation information and a second bounding box associated with the second segmentation information; determining an intersection over union (IOU) region for the first bounding box and the second bounding box; identifying anomalous behavior based on the IOU region; and generating one or more alerts identifying the anomalous behavior.

In some aspects, the techniques described herein relate to a non-transitory computer-readable device having instructions thereon that, when executed by at least one computing device, causes the at least one computing device to perform operations including: generating first segmentation information and second segmentation information from a video feed, the first segmentation information corresponding to a first potential occupant and the second segmentation information corresponding to a second potential occupant; determining that the first segmentation information and the second segmentation information correspond to actual occupants based on the first segmentation information and the second segmentation information being greater than a predefined threshold; generating a first bounding box associated with the first segmentation information and a second bounding box associated with the second segmentation information; determining an intersection over union (IOU) region for the first bounding box and the second bounding box; identifying anomalous behavior based on the IOU region; and generating one or more alerts identifying the anomalous behavior.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

Various objects, aspects, features, and advantages of the disclosure will become more apparent and better understood by referring to the detailed description taken in conjunction with the accompanying drawings, in which like reference characters identify corresponding elements throughout. In the drawings, like reference numbers generally indicate identical, functionally similar, and/or structurally similar elements.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known components may be shown in block diagram form in order to avoid obscuring such concepts.

Implementations of the present disclosure provide systems, methods for detection of anomalous behavior. The systems, methods are computationally less complex as compared to conventional systems. These systems, methods, and apparatuses will be described in the following detailed description and illustrated in the accompanying drawings by various modules, blocks, components, circuits, processes, algorithms, among other examples (collectively referred to as "elements"). These elements may be implemented using electronic hardware, computer software, or any combination thereof. Whether such elements are implemented as hardware or software depends upon the particular application and design constraints imposed on the overall system. By way of example, an element, or any portion of an element, or any combination of elements may be implemented as a "processing system" that includes one or more processors. Examples of processors include microprocessors, microcontrollers, graphics processing units (GPUs), central processing units (CPUs), and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, among other examples, whether referred to as software, firmware, middleware, microcode, hardware description language, or otherwise.

Figure 1:
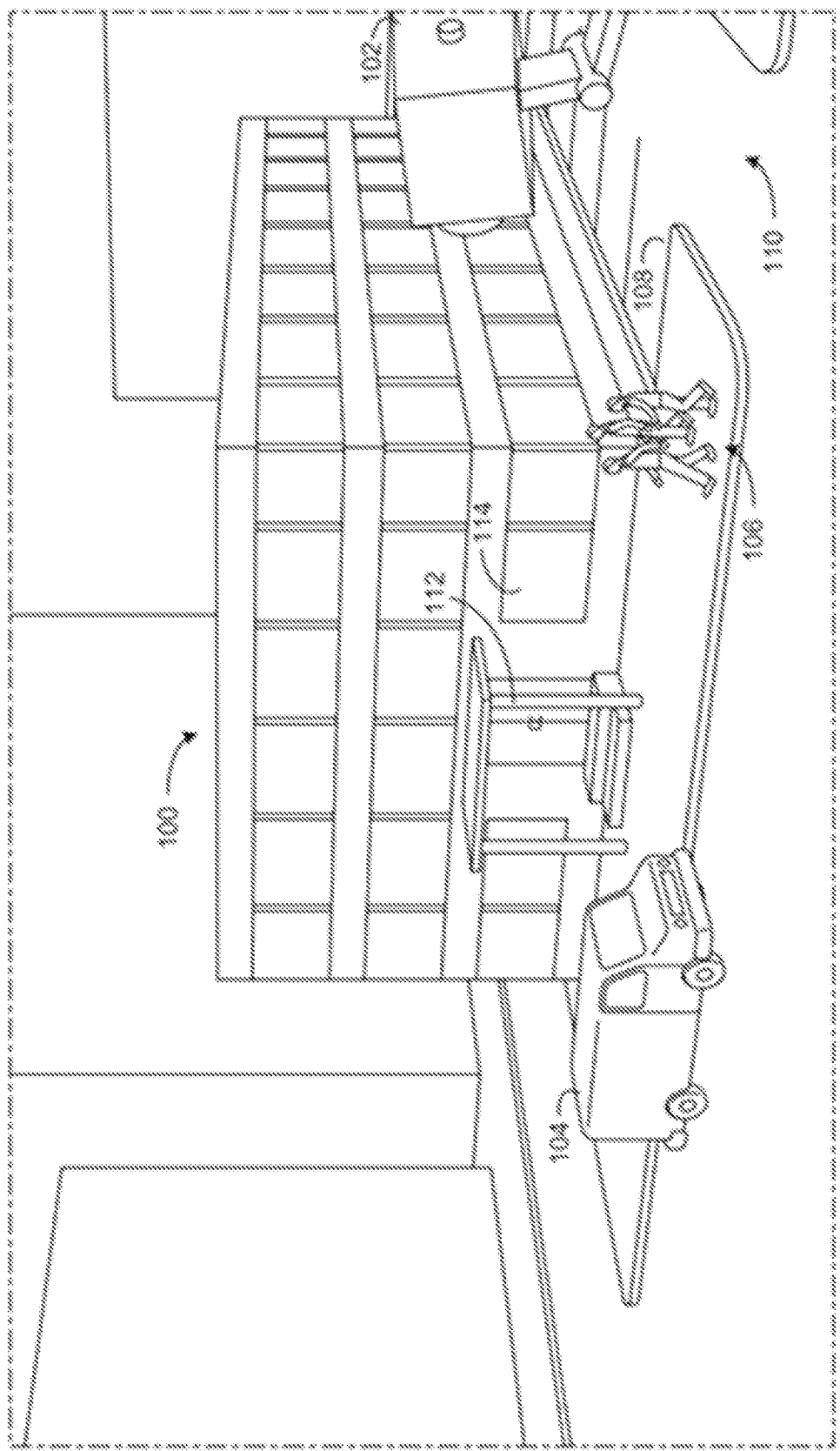
FIG. 1 is a perspective view schematic drawing of a building with security features, according to some embodiments.

Referring now to FIG. 1, a building 100 with a security camera 102 (e.g., a video capture device) and a parking lot 110 is shown, according to an exemplary embodiment. The building 100 is a multi-story building surrounded by, or near, the parking lot 110 but can be any type of building in some embodiments. The building 100 may be a school, a hospital, a store, a place of business, a residence, a hotel, an office building, an apartment complex, etc. The building 100 can be associated with the parking lot 110.

Both the building 100 and the parking lot 110 are at least partially in the field of view of the security camera 102. In some embodiments, multiple security cameras 102 may be used to capture the entire building 100 and parking lot 110 not in (or in to create multiple angles of overlapping or the same field of view) the field of view of a single security camera 102. The parking lot 110 can be used by one or more vehicles 104 where the vehicles 104 can be either stationary or moving (e.g. busses, cars, trucks, delivery vehicles). The building 100 and parking lot 110 can be further used by one or more pedestrians 106 who can traverse the parking lot 110 and/or enter and/or exit the building 100. The building 100 may be further surrounded, or partially surrounded, by a sidewalk 108 to facilitate the foot traffic of one or more pedestrians 106, facilitate deliveries, etc. In other embodiments, the building 100 may be one of many buildings belonging to a single industrial park, shopping mall, or commercial park having a common parking lot and security camera 102. In another embodiment, the building 100 may be a residential building or multiple residential buildings that share a common roadway or parking lot.

The building 100 is shown to include a door 112 and multiple windows 114. An access control system can be implemented within the building 100 to secure these potential entrance ways of the building 100. For example, badge readers can be positioned outside the door 112 to restrict access to the building 100. The pedestrians 106 can each be associated with access badges that they can utilize with the access control system to gain access to the building 100 through the door 112. Furthermore, other interior doors within the building 100 can include access readers. In some embodiments, the doors are secured through biometric information, e.g., facial recognition, fingerprint scanners, etc. The access control system can generate events, e.g., an indication that a particular user or particular badge has interacted with the door. Furthermore, if the door 112 is forced open, the access control system, via door sensor, can detect the door forced open (DFO) event.

The windows 114 can be secured by the access control system via burglar alarm sensors. These sensors can be configured to measure vibrations associated with the window 114. If vibration patterns or levels of vibrations are sensed by the sensors of the window 114, a burglar alarm can be generated by the access control system for the window 114.

Figure 2:
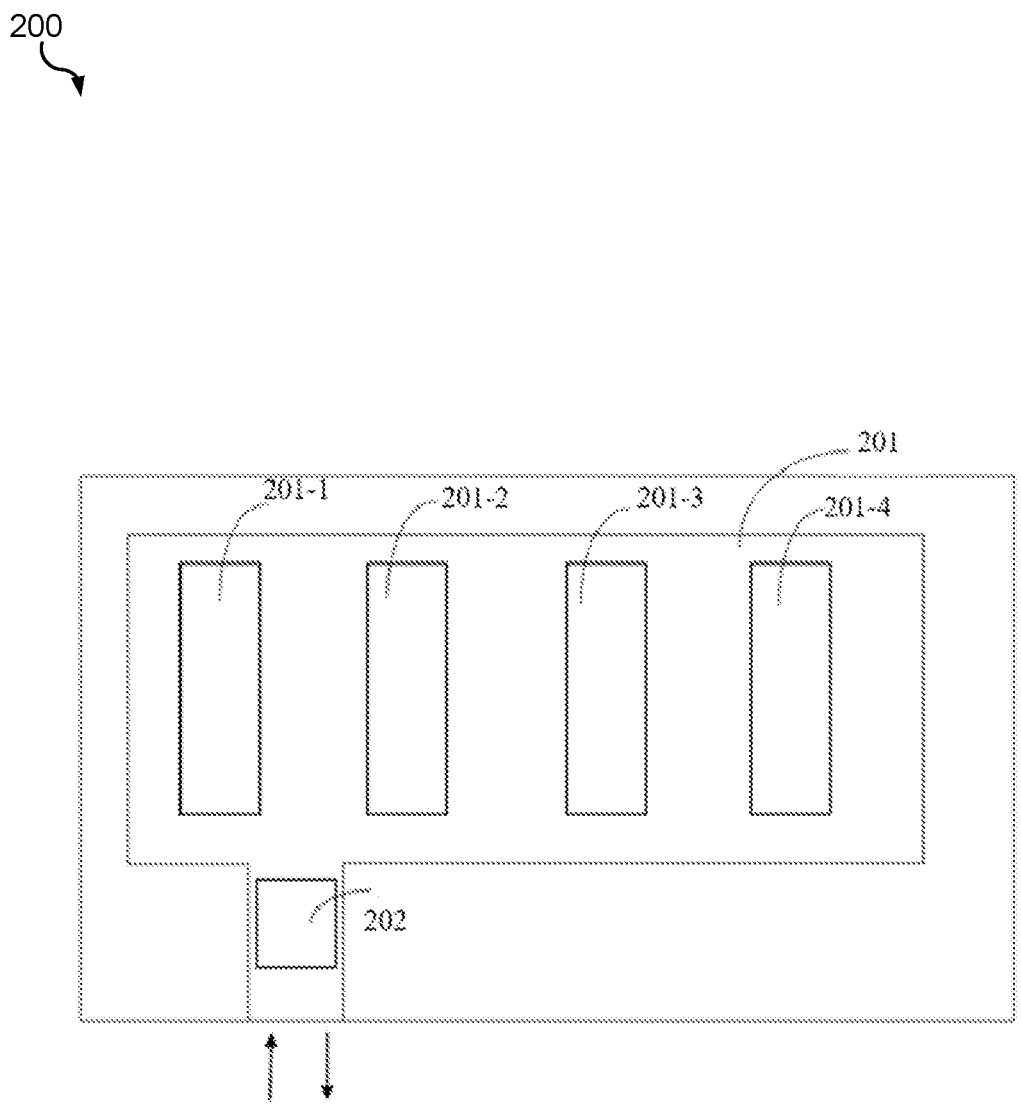
FIG. 2 is a layout of a retail environment, according to some embodiments.

Referring now to FIG. 2, a layout of a retail environment 200 is shown, according to some embodiment. The retail environment 200 is shown to comprise a retail section 201 having one or more sections for display and sale of products. In an embodiment, the retail section 201 may correspond to a fashion department of the retail environment 200, wherein section 201-1 may relate to menswear section, section 201-2 may relate to womenswear section, section 201-3 may relate to kids wear section, and section 201-4 may relate to section comprising products which are required for daily needs e.g., handkerchiefs, caps, handbags, wallet and the like.

The user is allowed to enter and exit the retail environment 200 through a gateway 202. FIG. 2 is shown to have a gateway having the entrance and exit ways adjacent to each other, however the entrance and exit ways may be at different points. Furthermore, the retail environment 200 may have more than one gateway to provide ease.

Though the retail section 201 is shown as a fashion wear outlet, the retail section 201 is not limited to only fashion department and may comprise an outlet for any retail products e.g., furniture, kitchenware, electronics, and the like. In some embodiments, the retail section 201 may correspond to a section of retail establishments like amusement parks, malls, multiplexes, and the like.

A user (a person who has entered the retail environment 200 for shopping) may access one or more products which he/she intends to purchase.

In some embodiments, the retail environment 200 may have one or more security devices (not shown), such as security cameras 102 (referred above in FIG. 1) for monitoring the retail environment 200.

Anomalous Behavior Detection Features

Figure 3:
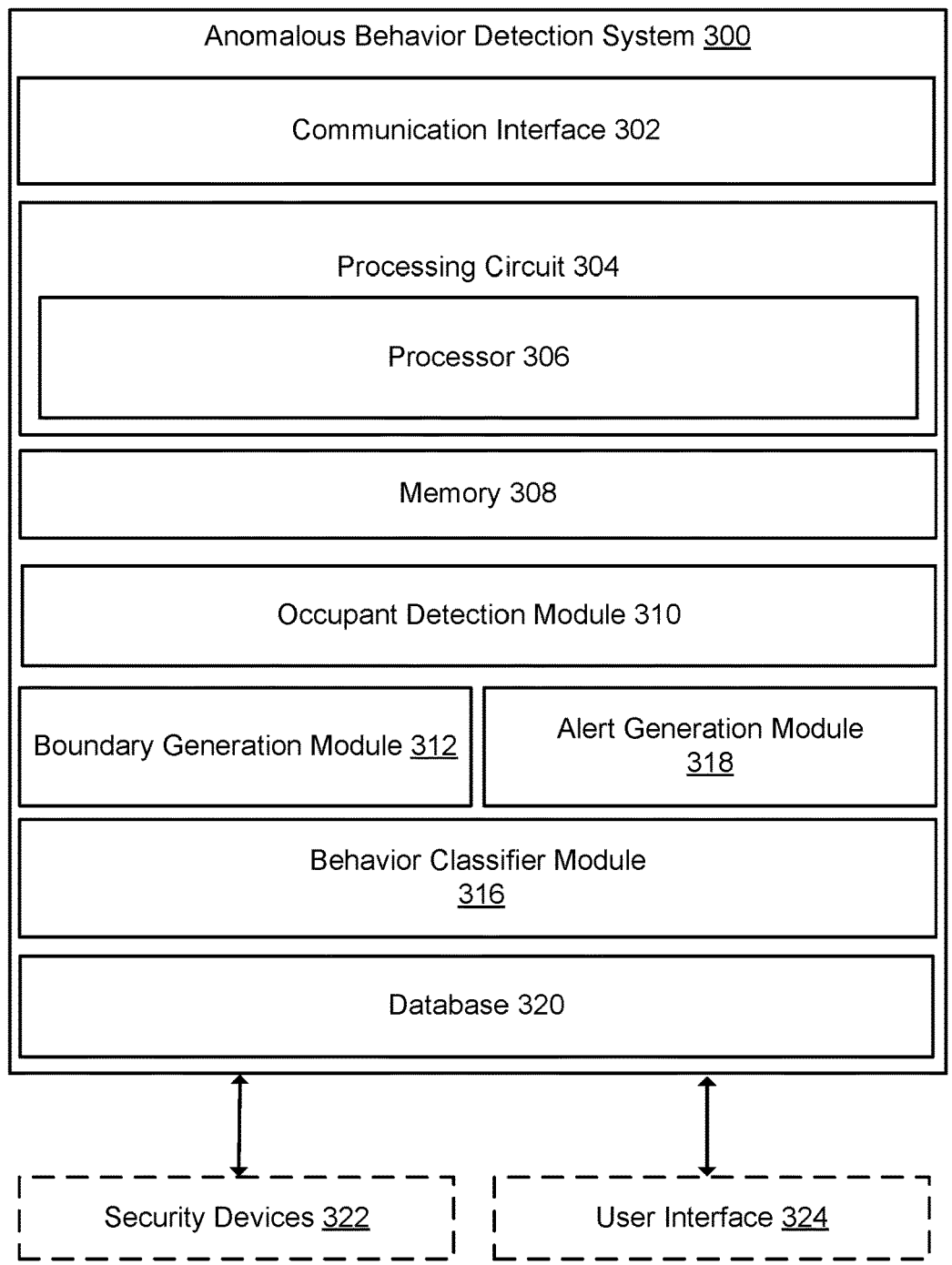
FIG. 3 is a block diagram of an anomalous behavior detection system, according to some embodiments.

Referring now to FIG. 3, a block diagram illustrating an anomalous behavior detection system 300 is shown, according to some embodiments. In some embodiments, the anomalous behavior detection system 300 may be one or more controllers, servers, and/or computers located in a security panel or part of a central computing system for the retail environment 200 (referred above in FIG. 2). The anomalous behavior detection system 300 is shown to include a communication interface 302 and a processing circuit 304. Communication interface 302 may include wired or wireless interfaces (e.g., jacks, antennas, transmitters, receivers, transceivers, wire terminals, etc.) for conducting data communications with various systems, devices, or networks. For example, communication interface 302 may include an Ethernet card and port for sending and receiving data via an Ethernet-based communications network and/or a Wi-Fi transceiver for communicating via a wireless communications network. Communication interface 302 may be configured to communicate via local area networks or wide area networks (e.g., the Internet, a building WAN, etc.) and may use a variety of communication protocols (e.g., BACnet, IP, LON, etc.).

Communication interface 302 may be a network interface configured to facilitate electronic data communications between the anomalous behavior detection system 300 and various external systems or devices (e.g., one or more security devices 322, user interfaces 324 etc.).

The processing circuit 304 is shown to include a processor 306 and a memory 308. The processor 306 may be a general purpose or specific purpose processor, an application specific integrated circuit (ASIC), one or more field programmable gate arrays (FPGAs), a group of processing components, or other suitable processing components. The processor 306 may be configured to execute computer code or instructions stored in memory 308 or received from other computer readable media (e.g., CDROM, network storage, a remote server, etc.).

The memory 308 may include one or more devices (e.g., memory units, memory devices, storage devices, etc.) for storing data and/or computer code for completing and/or facilitating the various processes described in the present disclosure. The memory 308 may include random access memory (RAM), read-only memory (ROM), hard drive storage, temporary storage, non-volatile memory, flash memory, optical memory, or any other suitable memory for storing software objects and/or computer instructions. The memory 308 may include database components, object code components, script components, or any other type of information structure for supporting various activities and information structures described in the present disclosure. The memory 308 may be communicably connected to the processor 306 via the processing circuit 304 and may include computer code for executing (e.g., by processor 306) one or more processes described herein.

The anomalous behavior detection system 300 is shown to be in communication with the one or more security devices 322. In some embodiments, the one or more security devices 322 may be connected to building equipment, surveillance systems etc. In some embodiments, the security devices 322 may be the security cameras 102 (referred above in FIG. 1). In one example, the security devices 322 may include a camera module (not shown in the figures) having an image sensor, video cameras, still image cameras, image and video processing systems for monitoring various rooms, hallways, parking lots, exterior of a building, roof of the building, etc. In some embodiments, the security devices 322 may include one or more depth sensors along with the security cameras 102 for capturing depth information for one or more objects or occupants of the building spaces. For example, the security devices 322 may include one or more sensors such as time of flight depth sensor, a structured light depth sensor, a LIDAR depth sensor, etc. The security devices 322 may provide data feed such as images, or video streams showing various spaces of a building (such as spaces of the retail environment 200 referred above in FIG. 2). In some embodiments, the data feed may be timestamped. In some embodiments, the data feed may be stored in the database 320. Although, FIG. 1 depicts database 320 as part of the anomalous behavior detection system 300, it is to be understood that the database 320 can be a separate component that can be a remote database or cloud storage.

Still referring to FIG. 3, the anomalous behavior detection system 300 is shown to be in communication with the user interface 324 typically, via the communication interface 302. In an embodiment, the user interface 324 may be implemented using an electronic device associated with a user that can be selected from, but not limited to, wearable devices (e.g., optical head mounted display, smartwatch, etc.), smart phones and/or mobile devices, desktops, computer, laptop and netbook computing devices, tablet computing devices, digital media devices, personal digital assistants (PDAs) and any other devices having communication capabilities and/or processing capabilities. In some embodiments, the user interface 324 may be associated with a user such as an admin of the retail environment 200 (referred above in FIG. 2), security agency, etc.

Further, the anomalous behavior detection system 300 is shown to include an occupant detection module 310. The occupant detection module 310 may be configured to receive the data feed such as images/video streams from the security devices 322. The occupant detection module 310 may be configured to analyze the data feed using one or more techniques such as machine learning, video processing, image processing, pattern recognition, background subtraction, etc., to detect presence of one or more potential targets in the data feed. The occupant detection module 310 may utilize one or more machine learning models stored in the database 320 to detect presence of one or more potential targets in the data feed. The machine learning models may be trained based on one or more historical images stored in the database 320. For example, the data feed may be segmented into a plurality of regions to identify one or more regions within the data feed that contain the potential targets. The occupant detection module 310 may compare the plurality of regions of the data feed with the historical images to detect presence of one or more potential targets. In one embodiment, the occupant detection module 310 may detect a plurality of potential targets within the data feed. In some embodiments, the occupant detection module 310 may be adapted to identify one or more regions of interest within the data feed that enable the processing circuit 304 to successfully determine presence of one or more potential targets.

Further, the occupant detection module 310 may determine a confidence value for each potential target detected in the data feed to confirm that the detected potential target is an occupant. Further, the confidence value may be compared with a predetermined threshold value. In some embodiments, the predetermined threshold value may be 92%. In one example, the occupant detection module 310 may identify one or more potential targets having a confidence value greater than 92%. Such confidence value exceeding the predetermined threshold value provides an assurance that the detected potential target is an occupant. However, if the confidence value is below the predetermined threshold value, it may be an indication that the detected potential target is a non-occupant (e.g., a mannequin).

Still referring to FIG. 3, the anomalous behavior detection system 300 is shown to include a boundary generation module 312. The boundary generation module 312 may be configured to communicate with the occupant detection module 310. The boundary generation module 312 may generate boundary representations such as a bounding box (402, 404, 406 shown in FIG. 4) corresponding to each occupant detected by the occupant detection module 310. In one non-limiting embodiment, the boundary generation module 312 may generate a single bounding box representing a single occupant within the data feed. The bounding boxes are generated to allow the anomalous behavior detection system 300 to apply behavior detection and related logics on the bounding boxes.

Further, an Intersection Over Union (IOU) region may be determined for two or more bounding boxes. The IOU region is computed by dividing an area of overlap between the two or more bounding boxes by an area of union of the two or more bounding boxes. The IOU region can be determined using the below equation (1):

$$IOU = \frac{\text{Area of Overlap of bonding boxes}}{\text{Area of Union of bonding boxes}} \quad \text{(Eq. 1)}$$

Further, the IOU region of bounding boxes may be compared with a predetermined threshold range having a lower limit and an upper limit. In some embodiments, the boundary generation module 312 may determine two or more bounding boxes having an IOU region within the predetermined threshold range such as lower limit<x<upper limit, where x is the IOU region.

Still referring to FIG. 3, the anomalous behavior detection system 300 is shown to include a behavior classifier module 316 that is trained to classify different types of behaviors such as anomalous or non-anomalous behaviors exhibited by the occupants. The behavior classifier module 316 may communicate with the boundary generation module 312. The behavior classifier module 316 may analyze the IOU region of the bounding boxes generated by the boundary generation module 312 to detect one or more features within the IOU region. For example, the behavior classifier module 316 may detect presence of movements of hands or legs of occupants suggesting anomalous behavior, presence of weapons, etc., within the IOU region of the bounding boxes. In some embodiments, the behavior classifier module 316 may utilize one or more techniques such as machine learning, image processing, pattern recognition or any other such techniques to analyze the IOU region of the bounding boxes.

In some embodiments, the behavior classifier module 316 may analyze spatial information of hand positions/movements detected in the IOU region of the bounding boxes with respect to one or more rules stored in the database 320 to classify the behavior of the occupant. For example, the hand positions may show that an occupant is attacking other occupants suggesting anomalous or aggressive behavior. The one or more rules may be generated using one or more machine learning models that are trained using a plurality of pre-stored images in the database 320. The pre-stored images may be annotated with a pre-determined set of behaviors based on the one or more rules. In some embodiments, the pre-stored images may be annotated using one or more sentiment analysis techniques. The sentiment analysis techniques may help to identify sentiments in the pre-stored images to determine behavior of occupants in the pre-stored images and further annotate the pre-stored images with the determined behavior. The behavior classifier module 316 may be configured to determine behavior exhibited by the occupant by comparing contents of the IOU region of the bounding boxes with the pre-stored images in the database 320. In some embodiments, the behavior classifier module 316 may perform three-dimensional tracking of occupants to determine behaviors exhibited by the occupants. In some embodiments, the behavior classifier module 316 may verify the detected anomalous behavior by assessing the data feed for a predetermined time period to reduce false detection of anomalous behavior.

Subsequent to determining the behavior exhibited by the occupants, one or more alerts may be generated. In some embodiments, the one or more alerts may be generated by an alert generation module 318. The alert generation module 318 may be configured to communicate with the behavior classifier module 316 to obtain information about behavior of the occupant. In some embodiments, the alert generation module 318 may be configured to generate and transmit one or more alerts to the user interface 324, if the behavior of the occupant is detected as anomalous. For example, one or more alerts may be generated if one or more occupants are attacking other occupants or showing any other type of violent behavior. In some embodiments, alert generation module 318 may be configured to generate the alerts in real-time based on detected anomalous behavior of occupants.

In some embodiments, the alerts may be in form of one or more notifications, alarms, etc. The one or more notifications may be in form of text, graphics, audio, video, buzzers, color-coded notifiers or any combination thereof. For example, a notification icon may be provided on the user interface 324 of the electronic device to display the one or more notifications from the anomalous behavior detection system 300. In other embodiments, the notification icon may be accompanied or replaced by audible alerts or indicators, flashing lights, or any other suitable means of notification. In some embodiments, the one or more notifications may include various types of information such as detected indoor location of occupant exhibiting anomalous behavior based on installation location of the security devices 322 that detected the occupant, date and time of detecting the anomalous behavior and the like. In some embodiments, the data feed having one or more occupants exhibiting anomalous behavior may also be provided to the user interface 324 along with the alerts.

Figure 4:
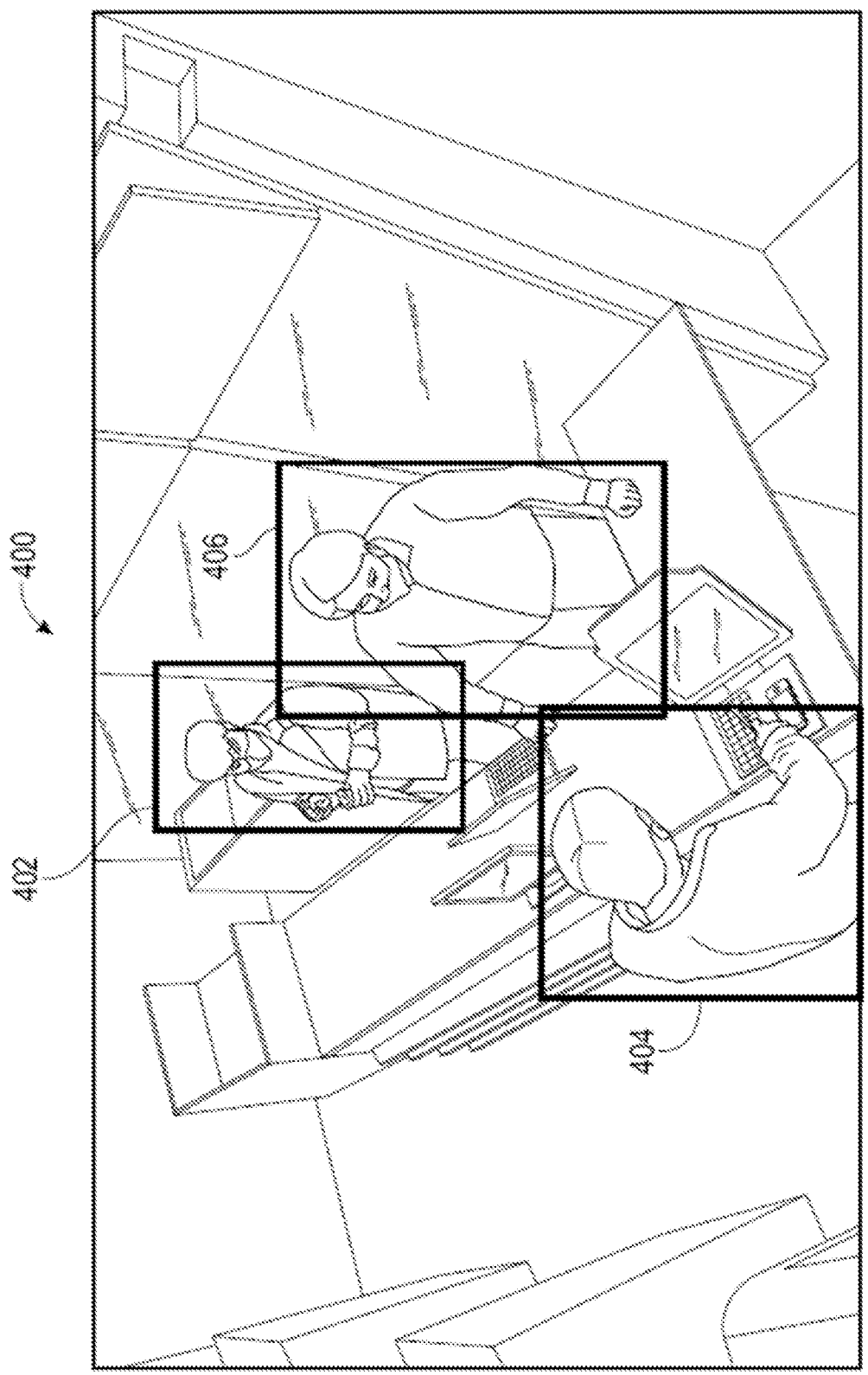
FIG. 4 is a snapshot of occupants detected by the anomalous behavior detection system of FIG. 3, according to some embodiments.

Referring now to FIG. 4, a snapshot of occupants detected by the anomalous behavior detection system 300 of FIG. 3 is shown, according to some embodiments.

The snapshot 400 shows an example of bounding boxes generated for occupants of a retail store. The occupants are detected in the data feed provided by the security devices 322 such as cameras installed in the retail store. The snapshot 400 shows detection of three occupants in the retail store and bounding boxes 402, 404, 406 are generated for each of the three occupants to further monitor behavior of the occupants in the retail store. The bounding boxes 402, 404, 406 are generated by the boundary generation module 312 (referred above in FIG. 3).

Figure 5:
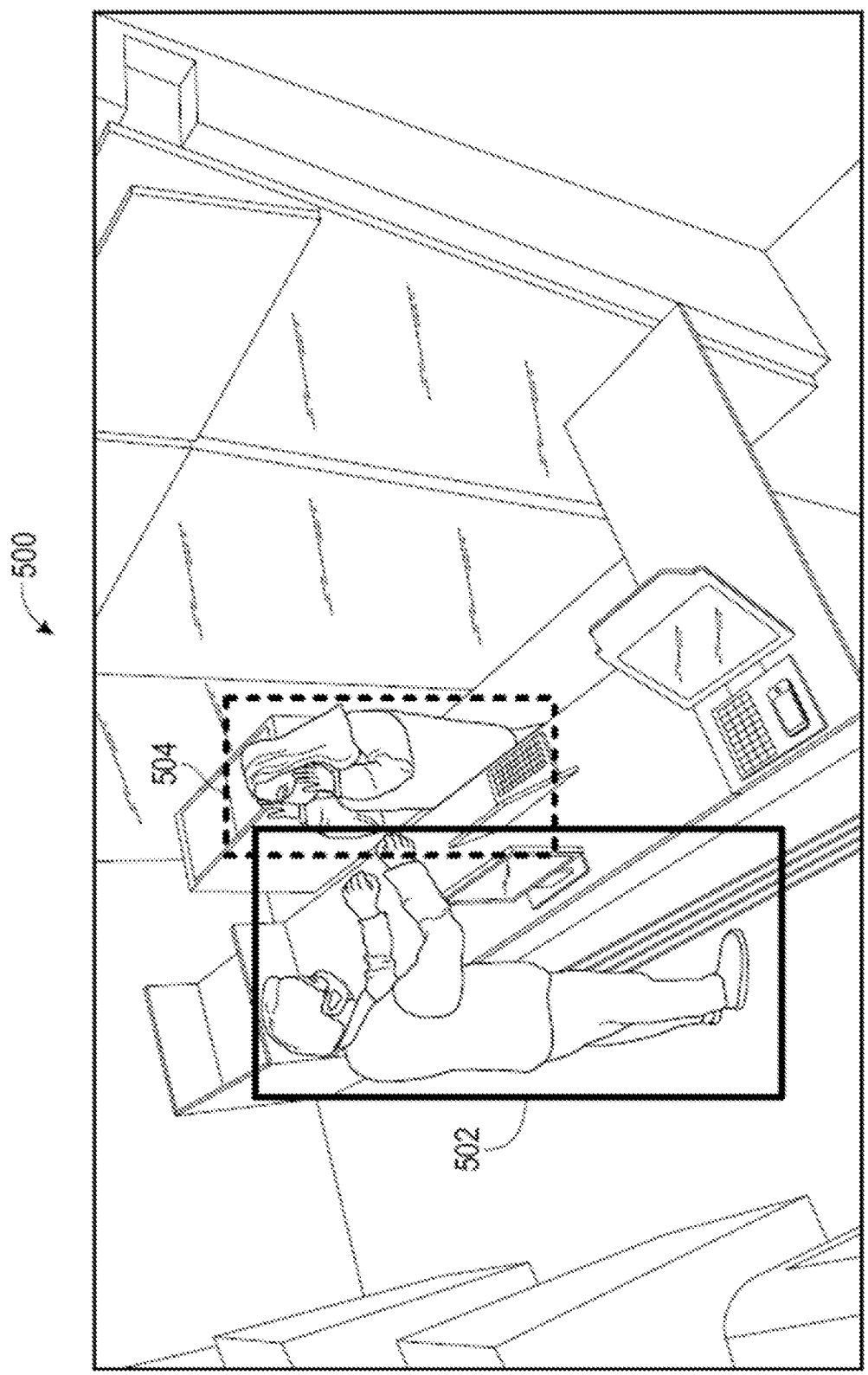
FIG. 5 is another snapshot of occupants detected by the anomalous behavior detection system, according to some embodiments.

Referring now to FIG. 5, another snapshot of occupants detected by the anomalous behavior detection system 300 is shown, according to some embodiments.

The snapshot 500 shows an example of bounding boxes 502, 504 generated for two occupants of a retail store. The bounding boxes 502, 504 are detected in the data feed provided by the security devices 322 such as cameras installed in the retail store. Further, the IOU region of bounding boxes 502, 504 of the two occupants is determined and compared with the predetermined threshold range. Subsequent to comparison, it is indicated that the IOU region of the bounding boxes 502, 504 falls outside the predetermined threshold range (e.g., below the lower limit of the predetermined threshold range). Such bounding boxes 502, 504 are not sufficient for accurate detection of anomalous behavior among occupants and are therefore, discarded for further evaluation thus determining non-anomalous behavior of the two occupants.

Figure 6:
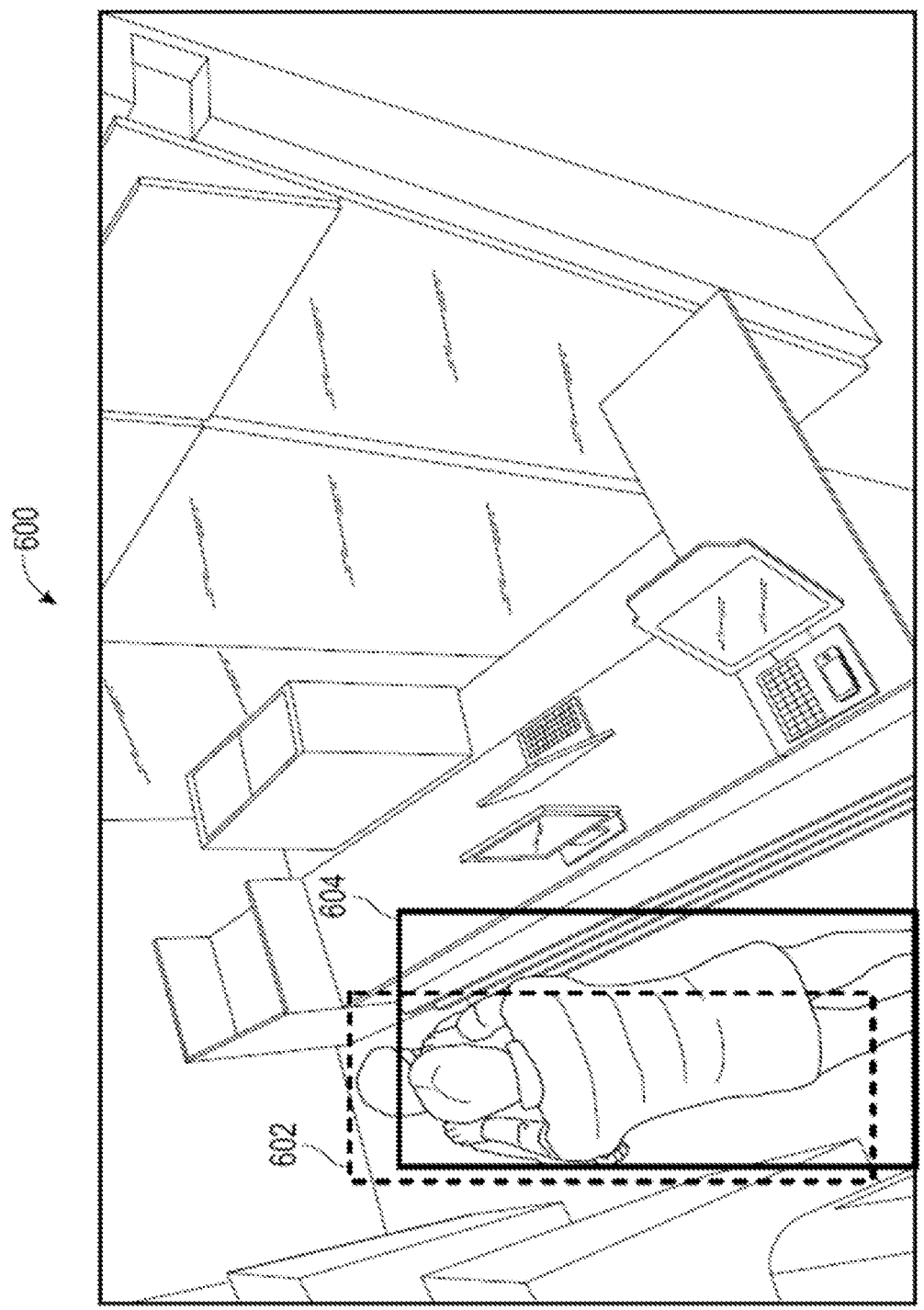
FIG. 6 is another snapshot of occupants detected by the anomalous behavior detection system, according to some embodiments.

Referring now to FIG. 6, another snapshot of occupants detected by the anomalous behavior detection system 300 is shown, according to some embodiments.

The snapshot 600 shows an example of bounding boxes 602, 604 generated for two occupants of a retail store. The bounding boxes 602, 604 are detected in the data feed provided by the security devices 322 such as cameras installed in the retail store. Further, the IOU region of bounding boxes 602, 604 of the two occupants is determined and compared with the predetermined threshold range. Subsequent to comparison, it is determined that the IOU region of the bounding boxes 602, 604 falls outside the predetermined threshold range (e.g., exceeds the upper limit of the predetermined threshold range). Such bounding boxes 602, 604 are not sufficient for accurate detection of anomalous behavior, since the IOU region exceeds the upper limit of the predetermined threshold range, indicating that same occupant might be detected twice and therefore the bounding boxes 602, 604 are overlapping to a higher extent. The bounding boxes 602, 604 are therefore discarded for further evaluation thus determining non-anomalous behavior of the two occupants.

Figure 7:
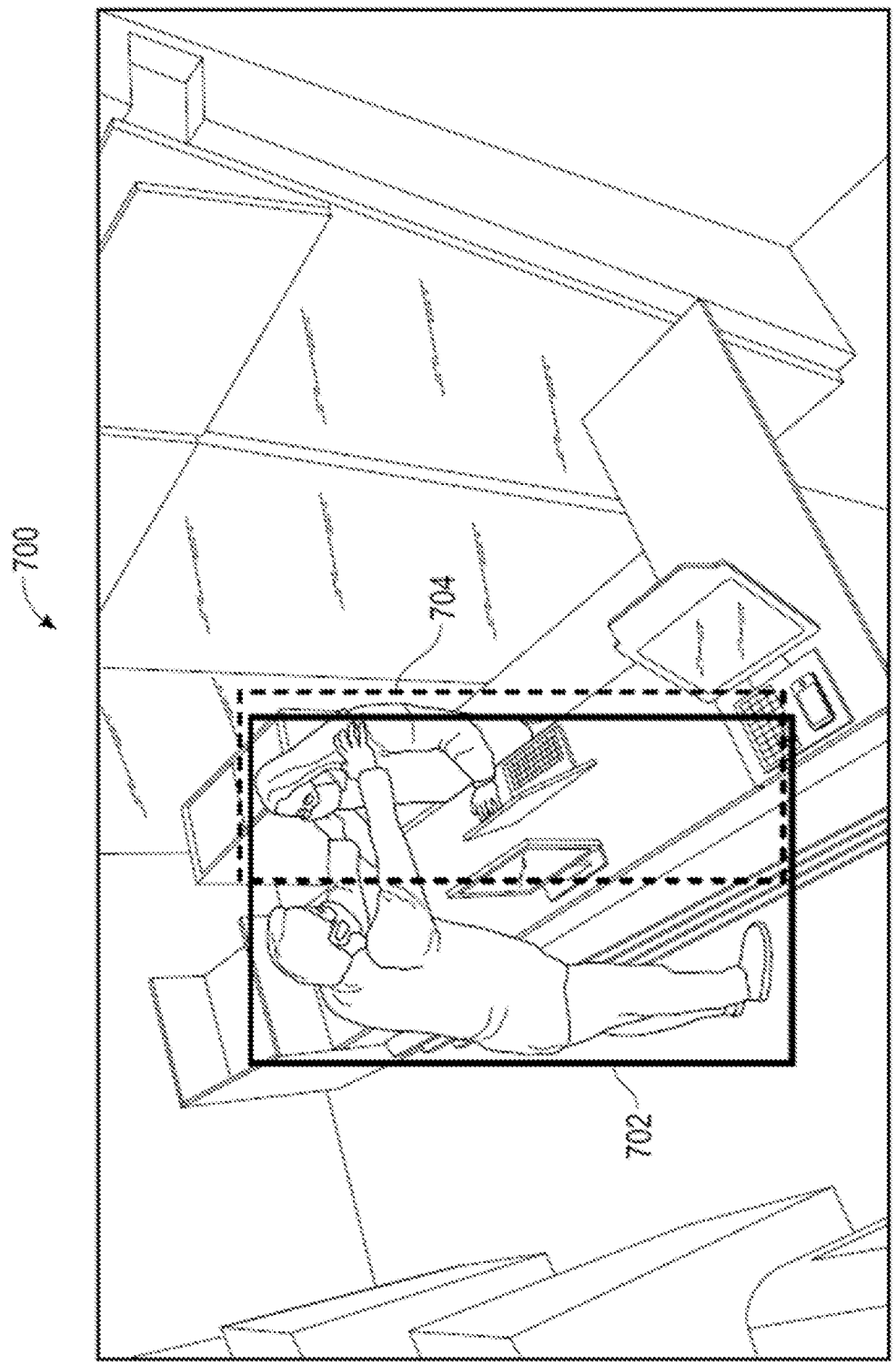
FIG. 7 is another snapshot of occupants detected by the anomalous behavior detection system, according to some embodiments.
Figure 8A:
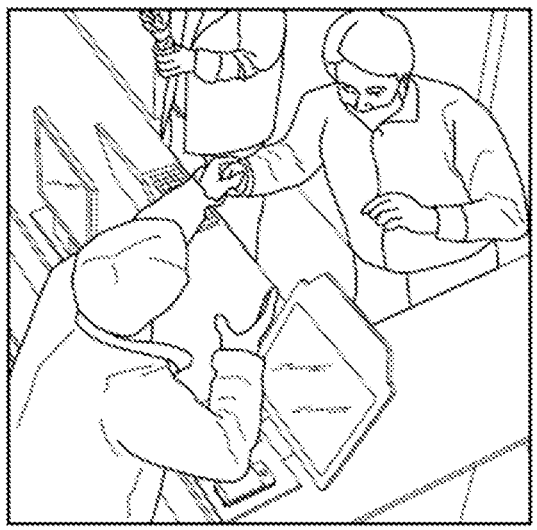
FIGS. 8a-8d shows snapshots illustrating examples of anomalous behavior among occupants of a retail store, according to some embodiments.
Figure 8B:
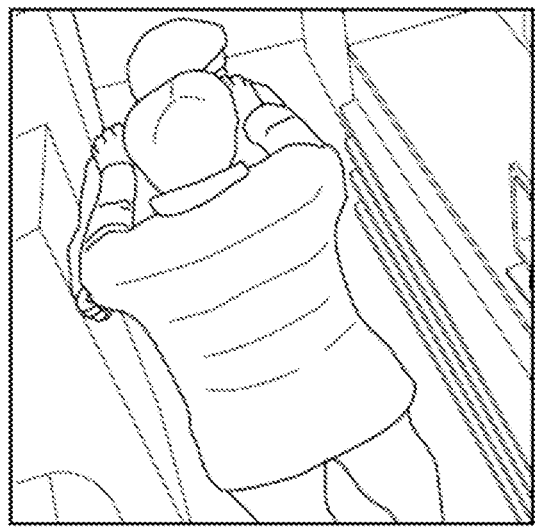
Figure 8C:
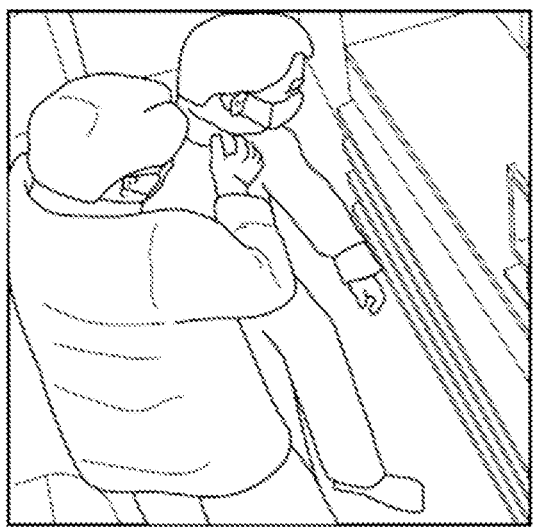
Figure 8D:
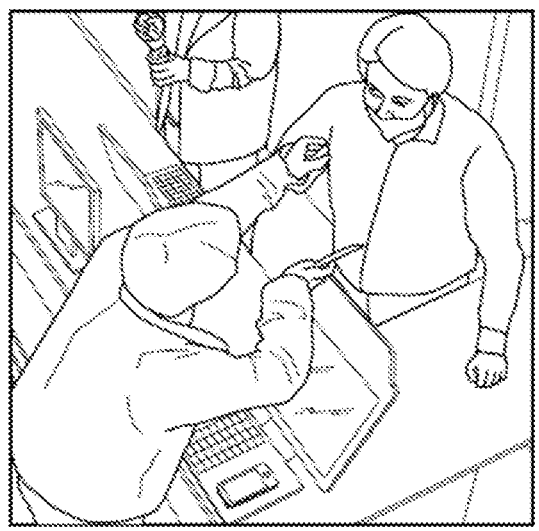
Figure 9A:
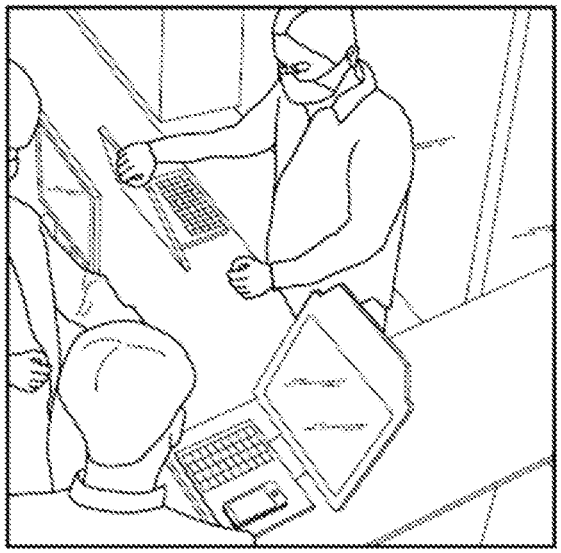
FIGS. 9a-9d shows snapshots illustrating examples of non-anomalous behavior among occupants of a retail store, according to some embodiments.
Figure 9B:
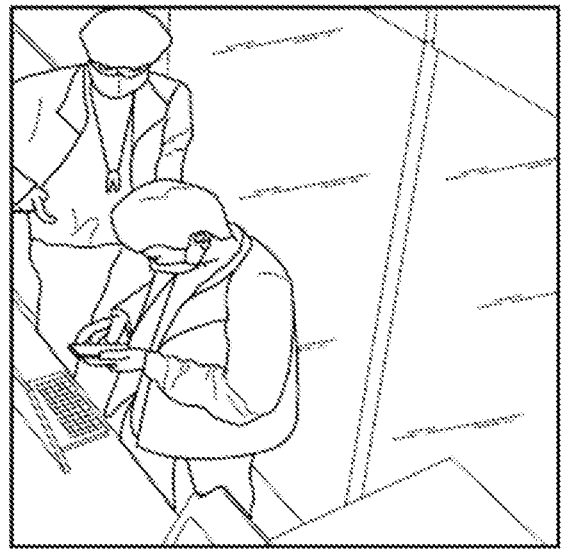
Figure 9C:
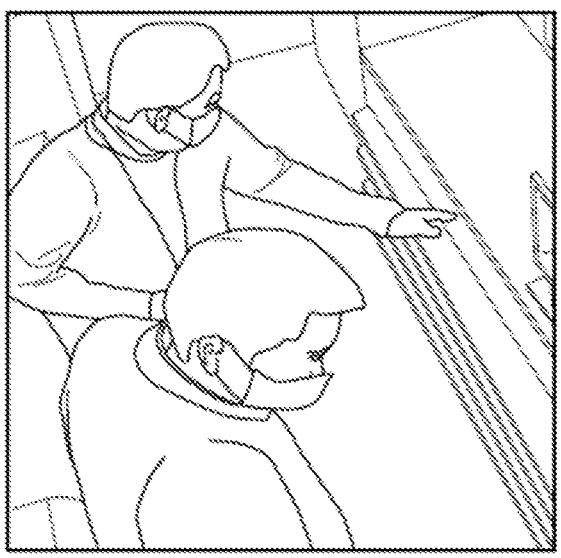
Figure 9D:
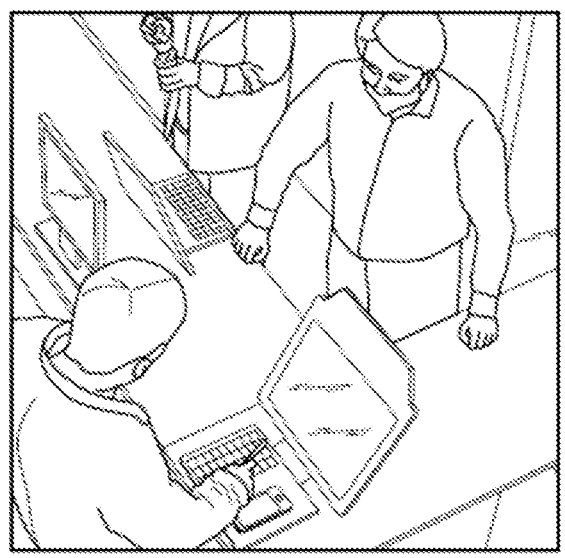

Referring now to FIG. 7, another snapshot of occupants detected by the anomalous behavior detection system 300 is shown, according to some embodiments.

The snapshot 700 shows an example of bounding boxes 702, 704 generated for two occupants of a retail store. Further, the IOU region of the bounding boxes 702, 704 of the two occupants is determined and compared with the predetermined threshold range. Subsequent to comparison, it is determined that the IOU region of the bounding boxes 702, 704 falls within the predetermined threshold range (i.e., lower limit<x<upper limit, where x is the IOU region). Therefore, such bounding boxes 702, 704 are utilized for further evaluation for accurate detection of anomalous behavior among occupants.

Referring now to FIGS. 8*a*-8*d*, snapshots illustrating examples of anomalous behavior among occupants of a retail store are shown, according to some embodiments.

The FIGS. 800*a*, 800*b*, 800*c*, 800*d* illustrate examples of different types of anomalous/aggressive behavior among occupants of a retail store. The anomalous behavior detection system 300 may detect such kinds of aggressive behavior exhibited by the occupants using the one or more machine learning techniques (referred above in FIG. 3) and generate one or more alerts that are transmitted to the user interface 324 based on such detected behavior.

Referring now to FIGS. 9*a* to 9*d*, snapshots illustrating examples of non-anomalous behavior among occupants of a retail store are shown, according to some embodiments.

The FIGS. 900*a*, 900*b*, 900*c*, 900*d* show examples of different types of non-aggressive/normal behavior among occupants of a retail store. The behavior classifier module 316 of the anomalous behavior detection system 300 differentiates such kinds of non-aggressive/normal behavior from other anomalous behaviors exhibited by the occupants.

Figure 10:
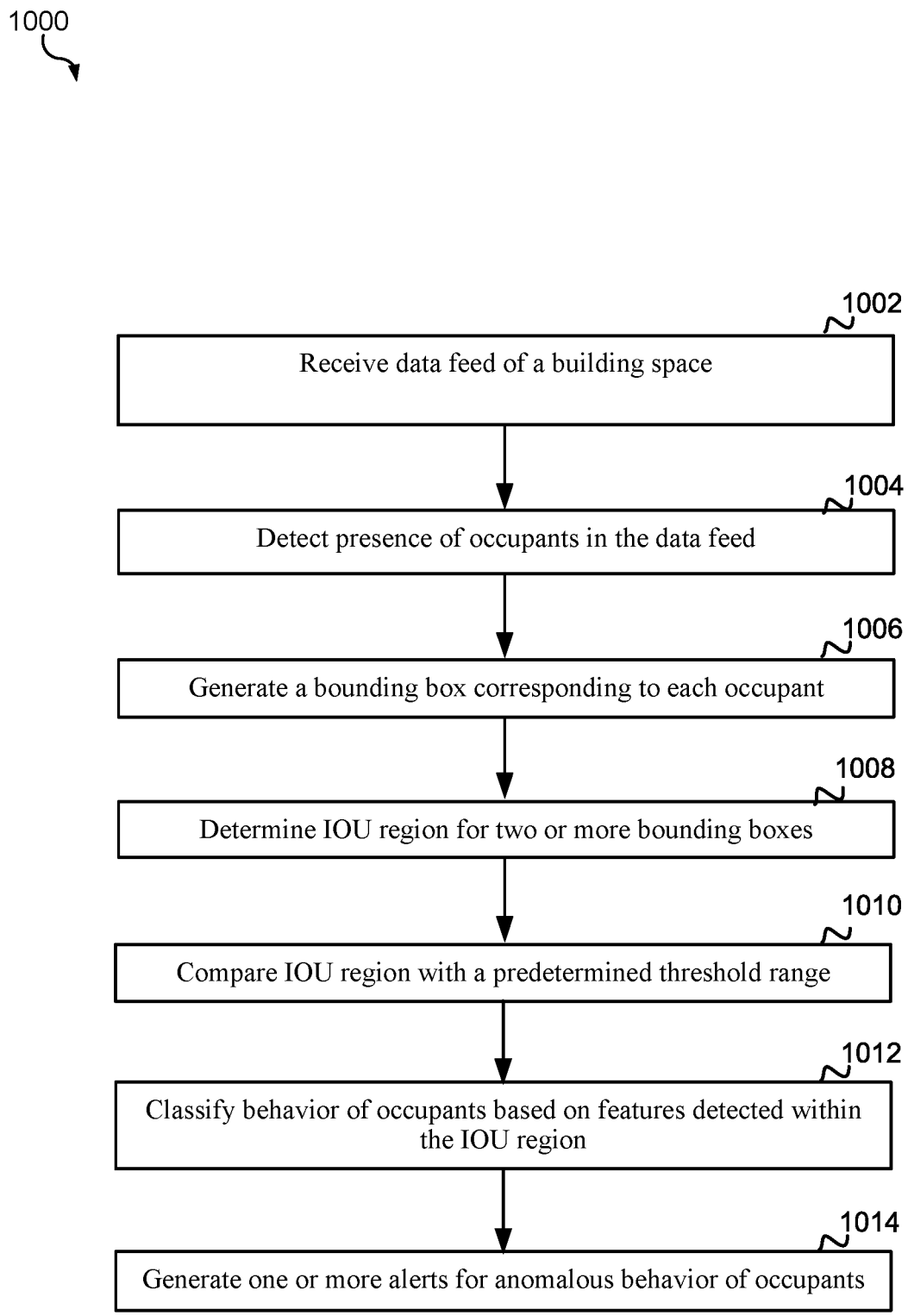
FIG. 10 is a flow chart of a method for detecting anomalous behavior, according to some embodiments.

Referring now to FIG. 10, a flow chart of a method for detecting anomalous behavior is shown, according to some embodiments.

In some embodiments, the method 1000 is performed by the anomalous behavior detection system 300 (referred above in FIG. 3). Alternatively, the method 1000 may be partially or completely performed by another computing system or controller of the retail environment 200 (referred above in FIG. 2). The method 1000 is shown to include receiving data feed of a building space (Step 1002). In some embodiments, the data feed may be received from one or more security devices 322 such as cameras, etc., (referred above in FIG. 3). The data feed may include images/video streams showing activities of one or more occupants of a building space such as retail stores, shopping malls or any other building space. In some embodiments, the data feed may be timestamped. In some embodiments, the data feed may be stored in the database 320 (referred above in FIG. 3). The data feed showing activities of one or more occupants may be used for monitoring the building space to ensure security of the building space.

Subsequent to receiving the data feed, presence of one or more potential targets may be detected in the data feed. In some embodiments, the presence of one or more potential targets in the data feed may be detected by the occupant detection module 310 (referred above in FIG. 3). In some embodiments, one or more machine learning models stored in the database 320 may be utilized to detect presence of one or more potential targets in the data feed. The data feed may be analyzed using one or more techniques such as machine learning, video processing, image processing, pattern recognition, background subtraction, etc., to detect presence of one or more potential targets in the data feed. One or more machine learning models stored in the database 320 may be utilized to detect presence of one or more potential targets in the data feed. The machine learning models may be trained based on one or more historical images stored in the database 320. For example, the data feed may be segmented into a plurality of regions to identify one or more regions within the data feed that contain the potential targets. The plurality of regions of the data feed may be compared with the historical images to detect presence of one or more potential targets.

Further, a confidence value for each potential target detected in the data feed may be determined to confirm that the detected potential target is an occupant (Step 1004). Further, the confidence value may be compared with a predetermined threshold value. In some embodiments, the predetermined threshold value may be 92%. In one example, one or more potential targets having a confidence value greater than 92% may be identified. Such confidence value exceeding the predetermined threshold value provides an assurance that the detected potential target is an occupant and not any other entity such as mannequins.

The method 1000 is further shown to include generating a bounding box corresponding to each occupant detected in the data feed (Step 1006). In some embodiments, the bounding boxes such as 402, 404, 406 (shown in FIG. 4) may be generated by the boundary generation module 312 (referred above in FIG. 3). The bounding boxes are generated to enable behavior detection and related logics to be applied on the bounding boxes.

Further, the method 1000 is shown to include determining an Intersection Over Union (IOU) region for two or more bounding boxes (Step 1008). The IOU region is computed by dividing an area of overlap between the two or more bounding boxes by an area of union of the two or more bounding boxes.

Further, the IOU region of bounding boxes may be compared with a predetermined threshold range having a lower limit and an upper limit (Step 1010). In some embodiments, two or more bounding boxes having an IOU region within the predetermined threshold range (such as lower limit<x<upper limit, where x is the IOU region) may be determined.

The method 1000 is further shown to include classifying behavior of one or more occupants (Step 1012). In some embodiments, the behavior of one or more occupants may be classified by the behavior classifier module 316 (referred above in FIG. 3) that is trained to classify different types of behaviors such as anomalous or non-anomalous behaviors exhibited by the occupants. In some embodiments, the IOU region of the bounding boxes may be analyzed to detect one or more features within the IOU region. For example, the IOU region of the bounding boxes may be analyzed to detect presence of movements of hands or legs of occupants suggesting anomalous behavior, presence of weapons etc., within the IOU region. In some embodiments, one or more techniques such as machine learning, image processing, pattern recognition or any other such techniques may be utilized to analyze the IOU region of the bounding boxes.

In some embodiments, spatial information of hand positions/movements detected in the IOU region may be analyzed with respect to one or more rules stored in the database 320 to classify the behavior of the occupant. For example, the hand movements may show that an occupant is attacking other occupants suggesting anomalous or aggressive behavior. The one or more rules may be generated using one or more machine learning models that are trained using a plurality of pre-stored images in the database 320. The pre-stored images may be annotated with a pre-determined set of behaviors based on the one or more rules. In some embodiments, the pre-stored images may be annotated with a pre-determined set of behaviors using one or more sentiment analysis techniques. The sentiment analysis technique may help to identify sentiments in the pre-stored images to determine behavior of persons in the pre-stored images and further annotate the pre-stored images with the determined behavior. The behavior exhibited by the occupant may be determined by comparing contents of the IOU region of the bounding box with the pre-stored images in the database 320. In some embodiments, three-dimensional tracking of occupants may be performed to determine behaviors of the occupants.

The method is further shown to include generating one or more alerts for anomalous behavior of occupants (Step 1014). In some embodiments, the one or more alerts may be generated by the alert generation module 318 (referred above in FIG. 3). Further, the one or more alerts may be transmitted to the user interface 324 (referred above in FIG. 3), if the behavior of the occupant is detected as anomalous. In some embodiments, the alerts may be generated in real-time based on detected anomalous behavior of occupants.

The alerts may be in form of one or more notifications, alarms etc. The one or more notifications may be in form of text, graphics, audio, video, buzzers, color-coded notifiers or any combination thereof. For example, a notification icon may be provided on the user interface 324 of the electronic device to display the one or more notifications from the anomalous behavior detection system 300. In other embodiments, the notification icon may be accompanied or replaced by audible alerts or indicators, flashing lights, or any other suitable means of notification. In some embodiments, the one or more notifications may include various types of information such as detected location of occupant exhibiting anomalous behavior based on installation location of the security devices 322 that detected the occupant, date and time of detecting the anomalous behavior and the like. In some embodiments, the data feed having one or more occupants exhibiting anomalous behavior may also be provided to the user interface 324 along with the alerts.

Figure 11:
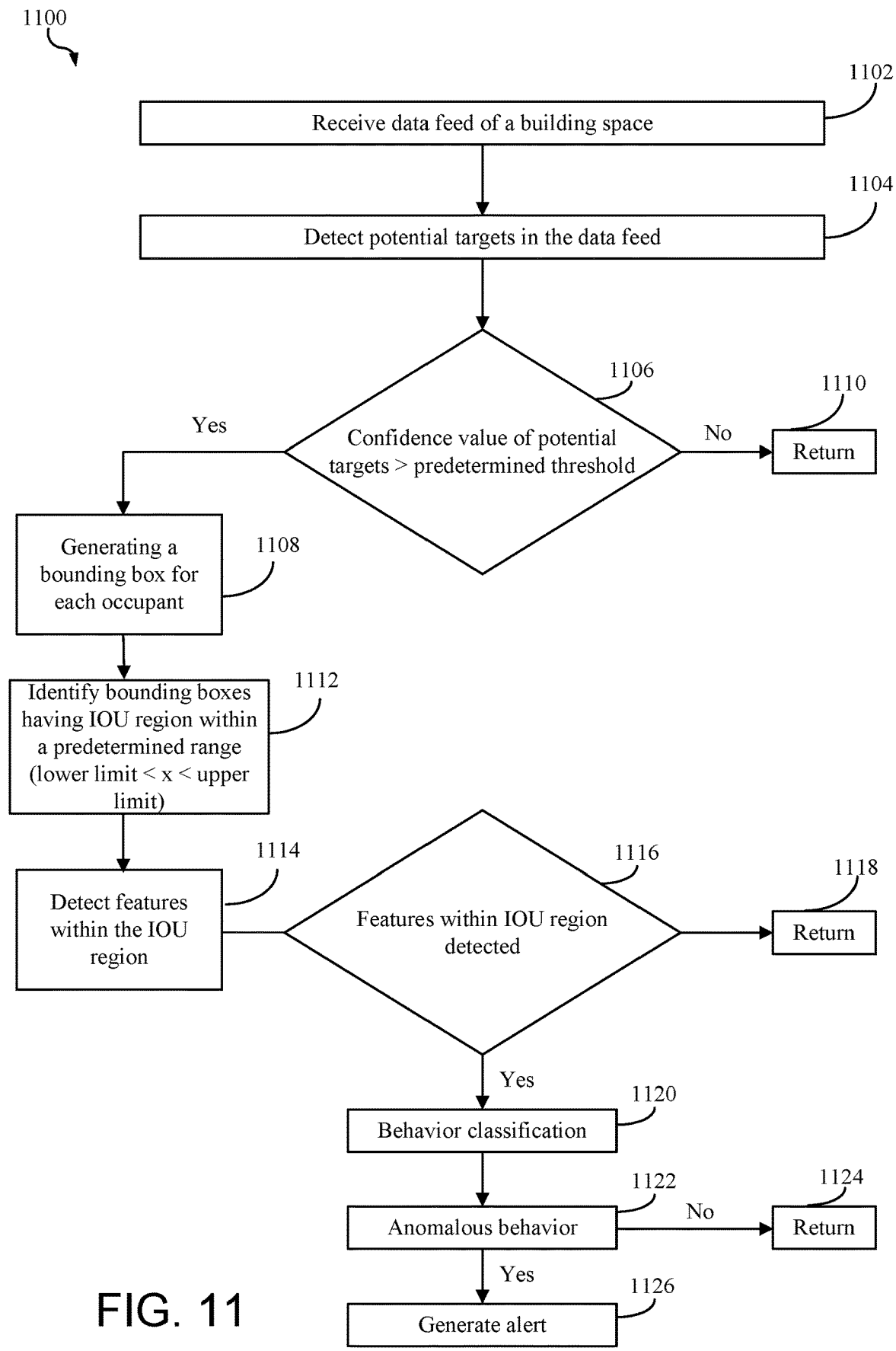
FIG. 11 is another flowchart of the method for detecting anomalous behavior, according to some embodiments.

Referring now to FIG. 11, a flowchart of a method for detecting anomalous behavior is shown, according to some embodiments.

In some embodiments, the method 1100 is performed by the anomalous behavior detection system 300 (referred above in FIG. 3). Alternatively, the method 1100 may be partially or completely performed by another computing system or controller of the retail environment 200 (referred above in FIG. 2). At block 1102, the method 1100 is shown to include receiving data feed of a building space. In some embodiments, the data feed may be received from the one or more security devices 322 such as cameras etc., (referred above in FIG. 3). In some embodiments, the data feed may show activities of one or more occupants of a building space such as retail stores, shopping malls or any other building space.

Subsequent to receiving the data feed, at block 1104, presence of one or more potential targets may be detected in the data feed. In some embodiments, the one or more potential targets may be detected by the occupant detection module 310 (referred above in FIG. 3). In some embodiments, one or more machine learning models stored in the database 320 may be utilized to detect presence of one or more potential targets in the data feed. The data feed may be analyzed using one or more techniques such as machine learning, video processing, image processing, pattern recognition etc., to detect presence of one or more potential targets in the data feed.

At block 1106, the method 1100 is shown to include determining a confidence value for each potential target detected in the data feed. Further, the confidence value may be compared with the predetermined threshold value. In some embodiments, predetermined threshold value may be 92%. If the confidence value for one or more potential targets is greater than the predetermined threshold value, i.e. result of block 1106 is Yes, then it indicates that the detected potential target is an occupant. However, if the confidence value for one or more potential targets is less than the predetermined threshold value, i.e. result of block 1106 is No, then the method 1100 returns at block 1110. This indicates that the detected potential target is a non-occupant. For example, in this case the detected potential target may be a mannequin.

Further at block 1108, a bounding box is generated for each occupant. Further, the IOU region of two or more bounding boxes may be determined by dividing an area of overlap between the two or more bounding boxes by an area of union of the two or more bounding boxes. Further, the IOU region of two or more bounding boxes may be compared with the predetermined threshold range having a lower limit and an upper limit. Further, at block 1112, two or more bounding boxes having an IOU region within the predetermined range (i.e., lower limit<x<upper limit, where x is the IOU region) may be identified.

Further, at block 1114 presence of one or more features within the IOU region of the bounding boxes may be detected. In some embodiments, the IOU region may be analyzed to detect one or more features in the IOU region. For example, the IOU region of the bounding boxes may be analyzed to detect presence of movements of hands or legs of occupants suggesting anomalous behavior, presence of weapons etc., within the IOU region. In some embodiments, one or more techniques such as machine learning, image processing, pattern recognition or any other such techniques may be utilized to analyze the IOU region of the bounding boxes.

Further, if features are not detected in the IOU region, i.e., result of block 1116 is No, then the method 1100 returns at block 1118. However, if the presence of features within the IOU region is detected i.e., result of block 1116 is Yes, then the behavior of the occupants is classified based on analysis of the features within the IOU region, at block 1120. In some embodiments, the behavior of one or more occupants may be classified by the behavior classifier module 316 (referred above in FIG. 3) that is trained to classify different types of behaviors of occupants such as anomalous (aggressive) or non-anomalous exhibited by the occupants based on one or more rules stored in the database 320. The one or more rules may be generated using one or machine learning models that are trained using a plurality of pre-stored images that are annotated with a pre-determined set of behaviors. In some embodiments, behavior exhibited by the occupants is determined by comparing contents of the IOU region of bounding box of the occupant with the pre-stored images in the database 320.

If the behavior of the occupant is identified as anomalous, i.e., result of block 1122 is Yes, then one or more alerts may be generated and transmitted to the user interface 324 (referred above in FIG. 3) at block 1126. In some embodiments, the alerts may be generated by the alert generation module 318 (referred above in FIG. 3). The alerts may be in form of one or more notifications, alarms etc. In some embodiments, the alerts may be generated in real-time based on detected anomalous behavior of occupants.

However, if the behavior of the occupant is identified as non-anomalous, i.e., result of block 1122 is no, then the method 1100 returns at block 1124.

Figure 12:
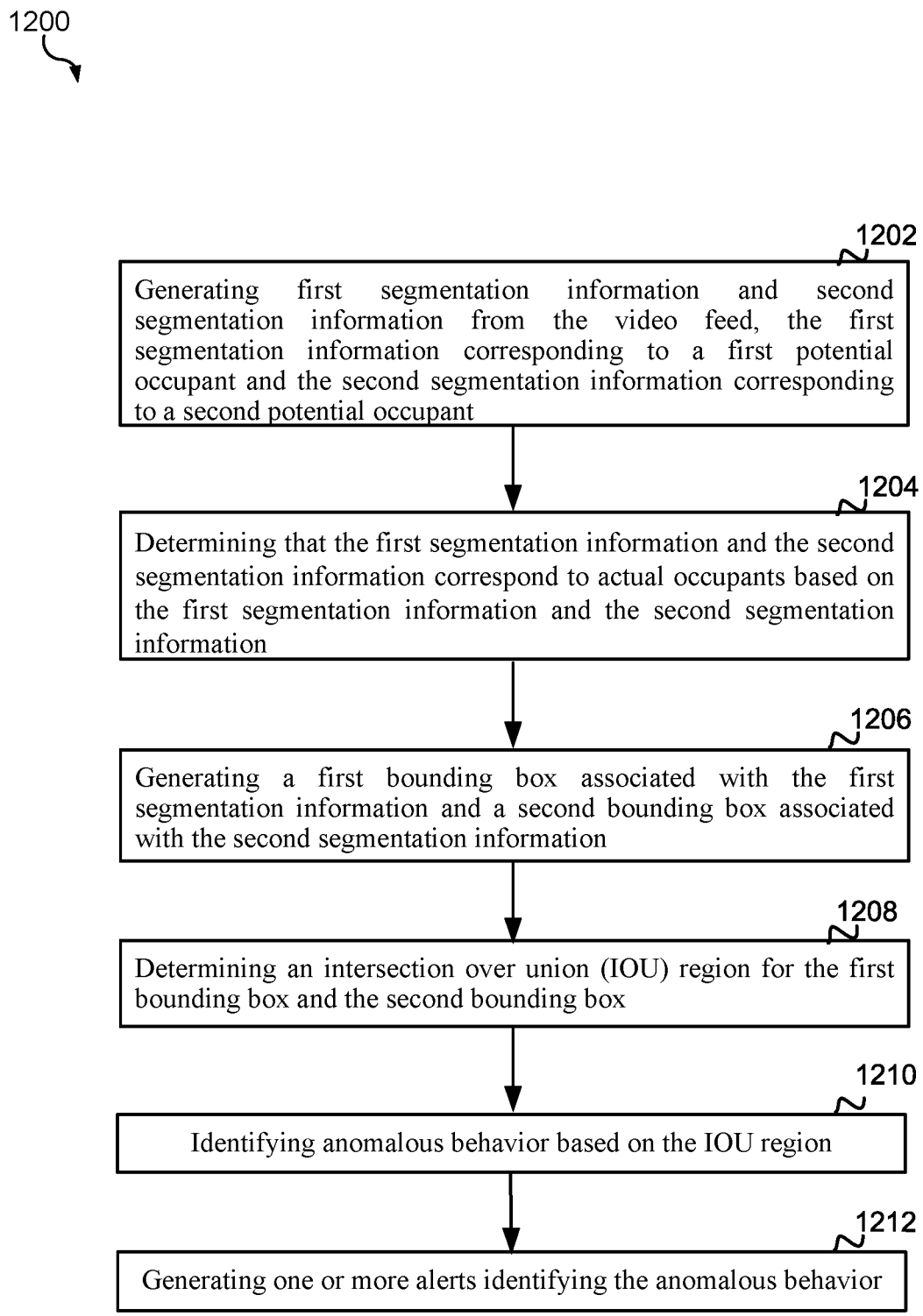
FIG. 12 is another flowchart of the method for detecting anomalous behavior, according to some embodiments.

Referring to FIG. 12, in operation, the anomalous behavior detection system 300 may perform an example method 1200 for object counting in high traffic volume. The method 1200 may be performed by one or more components of the anomalous behavior detection system 300, or any device/component described herein according to the techniques described with reference to FIGS. 1-11.

At block 1202, the method 1200 includes generating first segmentation information and second segmentation information from the video feed, the first segmentation information corresponding to a first potential occupant and the second segmentation information corresponding to a second potential occupant. For example, the anomalous behavior detection system 300 may receive the data feed from the one or more security devices 322. In some embodiments, the data feed may show activities of one or more occupants of a building space. Further, the occupant detection module 312 may segment the data feed into a plurality of regions to identify one or more regions within the data feed that contain potential occupants. Accordingly, the anomalous behavior detection system 300 or the processor 306 executing the occupant detection module 310 may provide means for generating first segmentation information and second segmentation information from the video feed, the first segmentation information corresponding to a first potential occupant and the second segmentation information corresponding to a second potential occupant.

At block 1204, the method 1200 includes determining that the first segmentation information and the second segmentation information correspond to actual occupants based on the first segmentation information and the second segmentation information being greater than a predefined threshold. For example, the occupant detection module 310 may generate a confidence value for each segment, and compare the confidence value to a predefined threshold. Further, if the confidence value for a segment is greater than the predefined threshold, the occupant detection module 310 may determine that the segment includes an occupant. Accordingly, the anomalous behavior detection system 300 or the processor 306 executing the object tracking component 122 may provide means for determining that the first segmentation information and the second segmentation information correspond to actual occupants based on the first segmentation information and the second segmentation information being greater than a predefined threshold.

At block 1206, the method 1200 includes generating a first bounding box associated with the first segmentation information and a second bounding box associated with the second segmentation information. For example, the boundary generation module 312 may generate a bounding box corresponding to each occupant detected in the data feed. Accordingly, the anomalous behavior detection system 300 or the processor 306 executing the boundary generation module 312 may provide means for generating a first bounding box associated with the first segmentation information and a second bounding box associated with the second segmentation information.

At block 1208, the method 1200 includes determining an intersection over union (IOU) region for the first bounding box and the second bounding box. For example, the boundary generation module 312 may determine the IOU region for two or more bounding boxes. In some aspects, the boundary generation module 312 computes the IOU region by dividing an area of overlap between the two or more bounding boxes by an area of union of the two or more bounding boxes. Accordingly, the anomalous behavior detection system 300 or the processor 306 executing the boundary generation module 312 may provide means for determining an intersection over union (IOU) region for the first bounding box and the second bounding box.

At block 1210, the method 1200 includes identifying anomalous behavior based on the IOU region. For example, the behavior classifier module 316 may analyze the IOU region of the bounding boxes to detect presence of movements of hands or legs of occupants suggesting anomalous behavior. Accordingly, the anomalous behavior detection system 300 or the processor 306 executing the behavior classifier module 316 may provide means for identifying anomalous behavior based on the IOU region.

At block 1212, the method 1200 includes generating one or more alerts identifying the anomalous behavior. For example, the alert generation module 318 may generate one or more alerts for anomalous behavior of occupants in the building space. Accordingly, the anomalous behavior detection system 300 or the processor 306 executing the alert generation module 318 may provide means for generating one or more alerts identifying the anomalous behavior.

Additionally, or alternatively, in some aspects, the techniques described herein relate to a system, wherein to determine the intersection over union (IOU) region for the first bounding box and the second bounding box, the at least one processor is further configured by the instructions to compute a ratio of an area of overlap of the first bounding box and the second bounding box to an area of union of the first bounding box and the second bounding box.

Additionally, or alternatively, in some aspects, the techniques described herein relate to a system, wherein to identify anomalous behavior based on the IOU region, the at least one processor is further configured by the instructions to: determine that the IOU region falls within a predefined range; classify a behavior of the actual occupants based on one or more features detected within the IOU region; and determine that the behavior is anomalous.

Additionally, or alternatively, in some aspects, the techniques described herein relate to a system, wherein to identify anomalous behavior based on the IOU region, the at least one processor is further configured by the instructions to: analyze one or more features in the IOU region with respect to one or more pre-stored images to identify the anomalous behavior, wherein the one or more pre-stored images are annotated with a predetermined set of behaviors based on one more rules generated using machine learning techniques.

Additionally, or alternatively, in some aspects, the techniques described herein relate to a system, wherein the machine learning techniques include sentiment analysis.

Additionally, or alternatively, in some aspects, the techniques described herein relate to a system, wherein the at least one processor is further configured by the instructions to cause display of the one or more alerts and the video feed via a user interface.

Additionally, or alternatively, in some aspects, the techniques described herein relate to a system, wherein the actual occupants are first actual occupants, the IOU region is a first IOU region, and the at least one processor is further configured by the instructions to: generate third segmentation information and fourth segmentation information from the video feed, the third segmentation information corresponding to a third potential occupant and the second segmentation information corresponding to a fourth potential occupant; determine that the third segmentation information and the fourth segmentation information correspond to second actual occupants based on the third segmentation information and the fourth segmentation information being greater than a predefined threshold; generate a third bounding box associated with the third segmentation information and a fourth bounding box associated with the fourth segmentation information; determine a second IOU region for the third bounding box and the fourth bounding box; and determine an absence of anomalous behavior between the second actual occupants based on the second IOU region being outside of a predefined range.

Configuration of Exemplary Embodiments

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements can be reversed or otherwise varied and the nature or number of discrete elements or positions can be altered or varied. Accordingly, all such modifications are intended to be included within the scope of the present disclosure. The order or sequence of any process or method steps can be varied or re-sequenced according to alternative embodiments. Other substitutions, modifications, changes, and omissions can be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure can be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps can be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A system comprising:
a video capture device configured to capture a video feed and provide the video feed to a processing device; and
the processing device comprising:
a memory storing instructions thereon; and
at least one processor coupled with the memory and configured by the instructions to:
generate first segmentation information and second segmentation information from the video feed, the first segmentation information corresponding to a first potential occupant and the second segmentation information corresponding to a second potential occupant;
determine that the first segmentation information and the second segmentation information correspond to actual occupants based on the first segmentation information and the second segmentation information being greater than a predefined threshold;
generate a first bounding box associated with the first segmentation information and a second bounding box associated with the second segmentation information;
determine an intersection over union (IOU) region for the first bounding box and the second bounding box;
identify anomalous behavior based on the IOU region; and
generate one or more alerts identifying the anomalous behavior.

2. The system of claim 1, wherein to determine the intersection over union (IOU) region for the first bounding box and the second bounding box, the at least one processor is further configured by the instructions to compute a ratio of an area of overlap of the first bounding box and the second bounding box to an area of union of the first bounding box and the second bounding box.

3. The system of claim 1, wherein to identify anomalous behavior based on the IOU region, the at least one processor is further configured by the instructions to:
determine that the IOU region falls within a predefined range;
classify a behavior of the actual occupants based on one or more features detected within the IOU region; and
determine that the behavior is anomalous.

4. The system of claim 1, wherein to identify anomalous behavior based on the IOU region, the at least one processor is further configured by the instructions to:
analyze one or more features in the IOU region with respect to one or more pre-stored images to identify the anomalous behavior, wherein the one or more pre-stored images are annotated with a predetermined set of behaviors based on one more rules generated using machine learning techniques.

5. The system of claim 4, wherein the machine learning techniques include sentiment analysis.

6. The system of claim 1, wherein the at least one processor is further configured by the instructions to cause display of the one or more alerts and the video feed via a user interface.

7. The system of claim 1, wherein the actual occupants are first actual occupants, the IOU region is a first IOU region, and the at least one processor is further configured by the instructions to:
generate third segmentation information and fourth segmentation information from the video feed, the third segmentation information corresponding to a third potential occupant and the second segmentation information corresponding to a fourth potential occupant;
determine that the third segmentation information and the fourth segmentation information correspond to second actual occupants based on the third segmentation information and the fourth segmentation information being greater than a predefined threshold;
generate a third bounding box associated with the third segmentation information and a fourth bounding box associated with the fourth segmentation information;
determine a second IOU region for the third bounding box and the fourth bounding box; and
determine an absence of anomalous behavior between the second actual occupants based on the second IOU region being outside of a predefined range.

8. A method comprising:
generating first segmentation information and second segmentation information from a video feed, the first segmentation information corresponding to a first potential occupant and the second segmentation information corresponding to a second potential occupant;
determining that the first segmentation information and the second segmentation information correspond to actual occupants based on the first segmentation information and the second segmentation information being greater than a predefined threshold;
generating a first bounding box associated with the first segmentation information and a second bounding box associated with the second segmentation information;
determining an intersection over union (IOU) region for the first bounding box and the second bounding box;
identifying anomalous behavior based on the IOU region; and
generating one or more alerts identifying the anomalous behavior.

9. The method of claim 8, wherein determining the intersection over union (IOU) region for the first bounding box and the second bounding box, comprises computing a ratio of an area of overlap of the first bounding box and the second bounding box to an area of union of the first bounding box and the second bounding box.

10. The method of claim 8, wherein identifying anomalous behavior based on the IOU region, comprises:
determining that the IOU region falls within a predefined range; and
classifying a behavior of the actual occupants based on one or more features detected within the IOU region; and
determining that the behavior is anomalous.

11. The method of claim 8, wherein identifying the anomalous behavior based on the IOU region comprises:
analyzing one or more features in the IOU region with respect to one or more pre-stored images to identify the anomalous behavior, wherein the one or more pre-stored images are annotated with a predetermined set of behaviors based on one more rules generated using machine learning techniques.

12. The method of claim 11, wherein the machine learning techniques include sentiment analysis.

13. The method of claim 8, further comprising causing display of the one or more alerts and the video feed via a user interface.

14. The method of claim 8, wherein the actual occupants are first actual occupants, the IOU region is a first IOU region, and further comprising:
- generating third segmentation information and fourth segmentation information from a video feed, the third segmentation information corresponding to a potential occupant and the second segmentation information corresponding to a potential occupant;
- determining that the third segmentation information and the fourth segmentation information correspond to second actual occupants based on the third segmentation information and the fourth segmentation information being greater than a predefined threshold;
- generating a third bounding box associated with the third segmentation information and a fourth bounding box associated with the fourth segmentation information;
- determining a second IOU region for the third bounding box and the fourth bounding box; and
- determining an absence of anomalous behavior between the second actual occupants based on the second IOU region being outside of a predefined range.

15. A non-transitory computer-readable device having instructions thereon that, when executed by at least one computing device, causes the at least one computing device to perform operations comprising:
- generating first segmentation information and second segmentation information from a video feed, the first segmentation information corresponding to a first potential occupant and the second segmentation information corresponding to a second potential occupant;
- determining that the first segmentation information and the second segmentation information correspond to actual occupants based on the first segmentation information and the second segmentation information being greater than a predefined threshold;
- generating a first bounding box associated with the first segmentation information and a second bounding box associated with the second segmentation information;
- determining an intersection over union (IOU) region for the first bounding box and the second bounding box;
- identifying anomalous behavior based on the IOU region; and
- generating one or more alerts identifying the anomalous behavior.

16. The non-transitory computer-readable device of claim 15, wherein determining the intersection over union (IOU) region for the first bounding box and the second bounding box, comprises computing a ratio of an area of overlap of the first bounding box and the second bounding box to an area of union of the first bounding box and the second bounding box.

17. The non-transitory computer-readable device of claim 15, wherein identifying anomalous behavior based on the IOU region, comprises:
- determining that the IOU region falls within a predefined range;
- classifying a behavior of the actual occupants based on one or more features detected within the IOU region; and
- determining that the behavior is anomalous.

18. The non-transitory computer-readable device of claim 15, wherein identifying the anomalous behavior based on the IOU region comprises:
- analyzing one or more features in the IOU region with respect to one or more pre-stored images to identify the anomalous behavior, wherein the one or more pre-stored images are annotated with a predetermined set of behaviors based on one more rules generated using machine learning techniques.

19. The non-transitory computer-readable device of claim 15, further comprising causing display of the one or more alerts and the video feed via a user interface.

20. The non-transitory computer-readable device of claim 15, wherein the actual occupants are first actual occupants, the IOU region is a first IOU region, and further comprising:
- generating third segmentation information and fourth segmentation information from the video feed, the third segmentation information corresponding to a potential occupant and the second segmentation information corresponding to a potential occupant;
- determining that the third segmentation information and the fourth segmentation information correspond to second actual occupants based on the third segmentation information and the fourth segmentation information being greater than a predefined threshold;
- generating a third bounding box associated with the third segmentation information and a fourth bounding box associated with the fourth segmentation information;
- determining a second IOU region for the third bounding box and the fourth bounding box; and
- determining an absence of anomalous behavior between the second actual occupants based on the second IOU region being outside of a predefined range.

* * * * *